United States Patent [19]

Damoci

[11] Patent Number: 4,633,302
[45] Date of Patent: Dec. 30, 1986

[54] VIDEO CASSETTE RECORDER ADAPTER

[75] Inventor: Joseph A. Damoci, Beltsville, Md.

[73] Assignee: Control Data Corporation, Minneapolis, Minn.

[21] Appl. No.: 781,855

[22] Filed: Oct. 1, 1985

[51] Int. Cl.[4] ............. H04N 17/04; H04N 17/06; H04H 9/00
[52] U.S. Cl. ............................. 358/84; 455/2
[58] Field of Search ................. 358/84; 455/2

[56] References Cited

U.S. PATENT DOCUMENTS

| | | | |
|---|---|---|---|
| 4,044,376 | 8/1977 | Porter | 358/84 |
| 4,388,644 | 6/1983 | Ishman et al. | 358/84 |
| 4,546,382 | 10/1985 | McKenna et al. | 358/84 |
| 4,574,304 | 3/1986 | Watanabe et al. | 358/84 |

FOREIGN PATENT DOCUMENTS 103438 3/1984 European Pat. Off. .

*Primary Examiner*—Keith E. George
*Attorney, Agent, or Firm*—J. A. Genovese; E. P. Heller

[57] ABSTRACT

An adapter for metering tv viewing in homes having video cassette recorders ("VCR's"). The adapter disables antenna (cable) input to the VCR except when in the record mode. Record mode is detected by a probe which detects the 70 MHz erase signal of the erase heads. When in record mode, antenna input to the VCR is enabled and a tv meter determines channel tuning. A bandpass filter on the VCR video output restricts the tv's ability to tube channels other than the VCR output. If the tv is tuned to the VCR output channel, the viewer is monitoring the program being recorded or watching a prerecorded tape. Otherwise, he is tuning through the normal antenna (cable) input and a meter determines the tv's channel tuning.

6 Claims, 3 Drawing Figures

VIDEO CASSETTE RECORDER ADAPTER

BACKGROUND OF THE INVENTION

1. Field of the Invention

The invention relates generally to the field of metering of tv sets for the purpose of audience measurement, and more particularly to metering of those homes having both a tv set and a VCR.

2. Brief Description of the Prior Art

Audience measurement for commercially supported tv is typically determined by meters connected to the antenna inputs and the tv sets of the audience. The meters determine when and for how long a tv set is tuned to particular channels. Most meters do this by injecting a special signal into the channels one by one and monitoring the tv's tuner output for the presence of this signal.

VCR's present many complications to this traditional scheme. First they contain their own tuner's by which the input to the tv set on the VCR output channel (typically channel 2, 3 or 4) may be any one of the broadcast (cable) channels. Determining that the tv is tuned to channel 3, for example proves nothing. Second, the householder may recorded one channel while viewing another using his tv's tuner and view the recorded program later. Finally, during record or playback, he may use the VCR/TV button to pass the antenna input directly to the tv, bypassing a conventional tv meter connected to the antenna inputs.

SUMMARY OF THE INVENTION

The invention comprises an adapter preceding one or more conventional tv meters connected to a VCR and one or more tv sets. The adapter operates on the assumption that everything recorded by the VCR will eventually be viewed during playback. When the VCR is in record mode, a tv meter associated with the VCR is enabled to determine the channel to which the VCR is tuned. Also when in record, a bandpass filter connected to the VCR output allows only the VCR output channel to be passed to the TV set thereby disabling the VCR/TV feature of the VCR. This prevents the VCR from passing the raw broadcast or cable signal to the TV set from the VCR. At other times, such as when the VCR is inactive or only in playback mode, the VCR antenna inputs are disabled through scrambling and the tv meter associated with the VCR is disabled.

The adapter also has means for conveying the antenna or cable input through an special A/B switch to a conventional tv meter associated with the tv set. By this, the viewer may, by setting the A/B switch, either watch what is on the antenna or cable using his tv's tuner or switch to the VCR output and watch a playback or monitor what is being recorded. The switch setting is input to the meter and if in the antenna position the meter logs the channel tuning of the tv set. If in the VCR position, the tv meter is inactive and the VCR meter logs the channel tuning of the VCR if it is in record.

VCR record mode is determined by monitoring the erase signal of the VCR. A cable is plugged into the VCR audio output, or an inductive probe antenna, tuned to the frequency of the erase signal, is placed under or attached to the VCR depending on the degree of signal received.

DESCRIPTION OF THE PREFERRED EMBODIMENT

Figure 1:
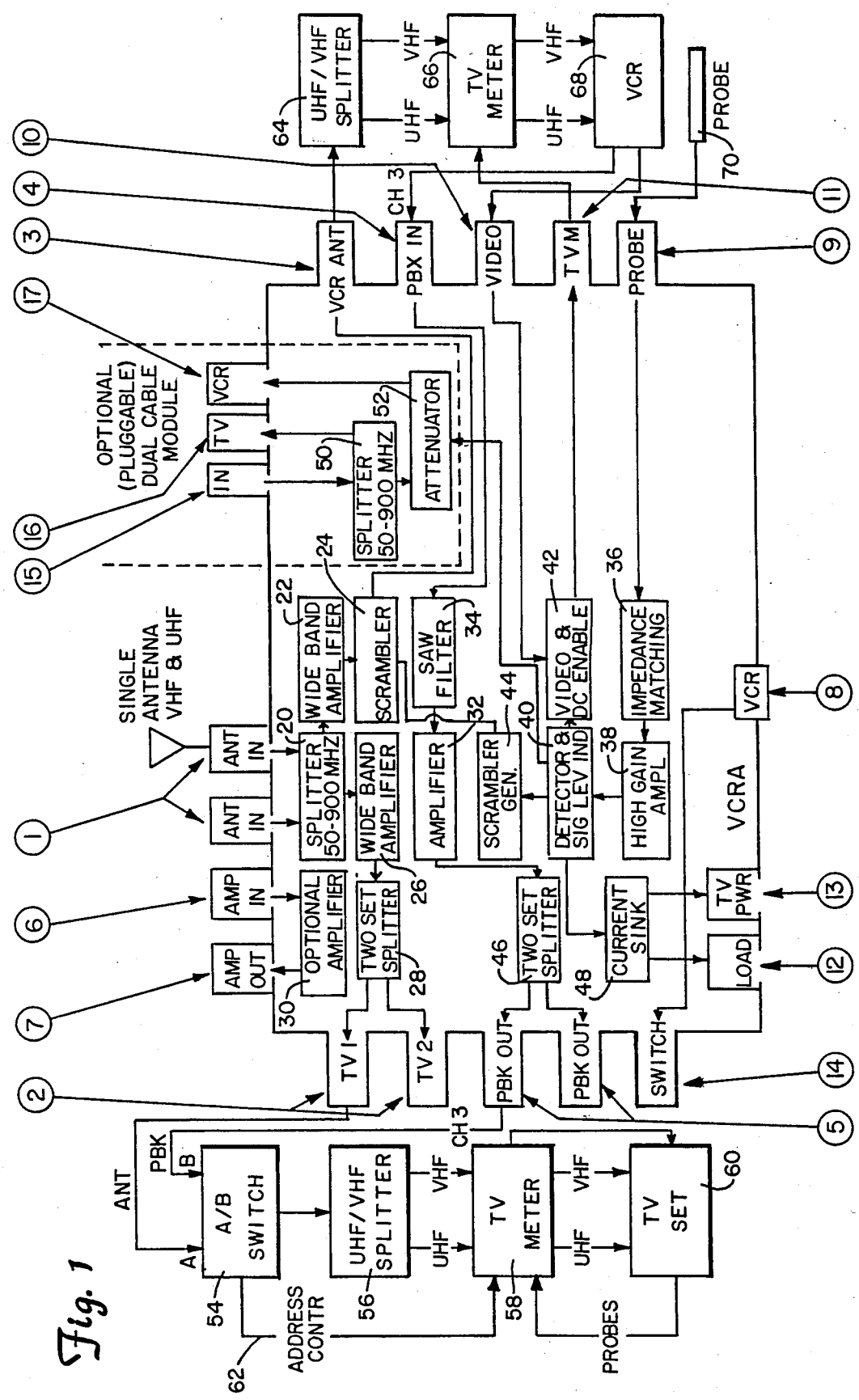
FIG. 1 shows a schematic block diagram of a VCR adapter ("VCRA") together with its connections to a tv set and a VCR and associated meters.

There are many different types of tv signal sources which may be input to a VCR and tv set configuration. FIG. 1 shows an illustrative example comprising one VCR and one tv set and associated meters and a single antenna input comprising VHF and UHF broadcast signals. As will become apparent, the VCRA may accommodate dual antenna inputs as well as single or dual cable inputs and two tv sets associated with one VCR.

The single antenna input at 1 in the Fig. (the other input is reserved for an antenna bearing UHF frequencies) is input to splitter 20 where it is mixed with the other antenna input, if any, and split into two signal paths, one going to the VCR and the other to the tv set(s). The branch going to the tv set(s) is first input to a wide band amplifier 26 to restore the signal strength lost in the splitters and then split again in splitter 28 so that two tv sets (and meters) may be plugged into tv outputs 2.

The branch going to the VCR is first input to another wide band amplifier 22, the output of which is input to a scambler 24, which essentially mixes an oscillating signal from scrambler generator 44 with the antenna signal from the wide band amplifier 22. The frequency of the oscillator is preferrably from 10 to 50 khz. The output of the scrambler 24 is provided to the VCR antenna output 3 which is plugged into a conventional VCR 68 and associate meter 66. As most such meters have separate UHF and VHF inputs, a UHF/VHF 64 is included prior to the meter.

The meter determines channel tuning (during record) using the conventional injection technique through the feedback from the VCR via its video output connected to the VCRA video input 10, which connects through video and dc enable 42 and output 11 back to the meter 66. The video and dc enable 42 permits this feeback only when the VCR is in record mode as will be discussed momemtarily.

The VCR tv output (denoted CH. 3 in the Figure, and which may be channel 2, 3 or 4 depending upon which local broadcast channel is free) is provided to the VCRA through input PBK IN 4, which stands for "playback in", although this input can also be effective for monitoring record. PBK IN is connected to a bandpass filter 34, preferably of the Standing Acoustical Wave type ("SAW") which restricts the frequencies passed to only channel 3 (or 2 or 4). The output of the filter 34 is amplified at 32 to restore filter and splitter losses and is provided to two set splitter 46 which connects to up to two two tv sets and meters through A/B switches 54 in this illustrative example.

The A/B switch ("ABSW") 54 is used to select between the antenna and VCR video signal sources. The setting of the switch is communicated to the tv meter 58 through address control 62. If the switch is set to A, the antenna is connected to the tv set 60 through a conventional UHF/VHF splitter 56 and tv meter 58. This input causes tv meter 58 to determine the channel to which the television is tuned using conventional injection techniques via the PROBES return to the tv meter 58. If the A/B switch is set to B, the VCR tv output is connected to the tv through these same devices. When the A/B switch is set to B, the meter does not determine the channel setting for audience measurement purposes; this is now the responsibility of the meter 66 associated with the VCR. If the VCR is in record mode, this latter meter 66 determines the VCR tuning as above described. If it is not in record, the VCR is either inactive or in playback, playing either a tape recorded off-the-air or a prerecorded tape. No channel tuning is determined by either meter.

The VCRA determines whether the VCR is in record mode by monitoring the erase signal present only when the VCR is recording. This signal is typically on the order of 70 Mhz and may be detected on the most VCR's via its audio output. Thus, typically, the audio output is connected through the PROBE input 9 of the VCRA to impedance matching circuit 36, the output of which is amplified in high gain amplifier 38 and input to detector 40. This detector is set to respond to a predetermined level of the 70 Mhz signal. If the detector 40 does not determine that the erase signal is present, it enables the scramble generator 44 to disable, through scrambler 24, the antenna input to the VCR and its associated meter through video enable 42. If the detector determines that the erase signal is present, it disables the scramble generator and enables the video and dc enable circuit 42 to feed the VCR's video output back to the meter 66 so that the meter may determine the channel tuning of the VCR using injection techniques. The dc signal provided by the video enable circuit 42 signals the meter to determine channel tuning.

When the detector 40 determines that the erase signal is present, it enables a dummy current sink 48 to signal to certain types of tv meters that the tv is "on", which in fact it may not be as the VCR may record a program for later viewing when the tv is off. In this case, the power output to the tv set of the meter associated with the VCR is plugged into the load output 12. If further, only one meter is used for both the VCR and tv set and the meter tv power output is plugged into load output 12, the tv set itself is plugged into tv power output 13.

Figure 2:
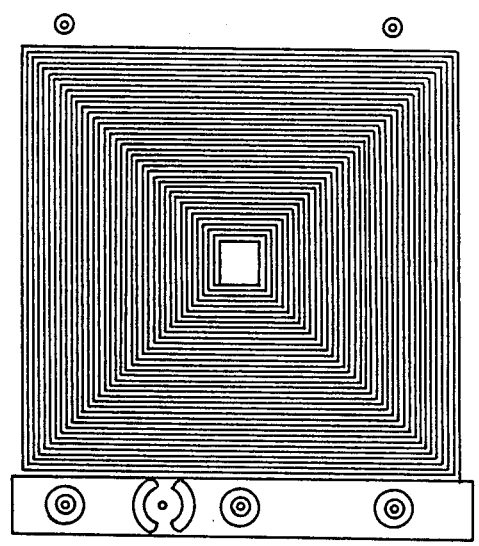
FIG. 2 shows a probe for sensing the VCR erase signal.
Figure 3:
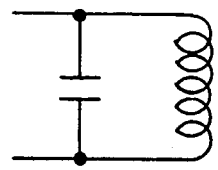
FIG. 3 shows a circuit diagram of the probe of FIG. 2.

In some types of VCR's, the audio output may not contain enough of the erase signal for proper detection. In this case, a series of more sensitive probes 70, an example of which is shown in FIG. 2, may be employed to sense the erase signal. These probes act as antennas and are tuned to resonate at 70 Mhz, the frequency of the erase signal. The resonant circuit comprising a capacitor and inductor combination is shown in FIG. 3. A first type of this probe is merely placed under the VCR at the point of greatest sensitivity. A second type is taped to the VCR at the point of greatest sensitivity. The last type includes a plurality of antennas coupled together for even greater sensitivity.

Also shown in the FIG. 1 is an optional module for those cable systems having dual cables. One cable is plugged in to antenna input 1 and the other is plugged into the IN input 15. This input 15 connects to a splitter 50, one output of which is provided to the tv set and associated meter as above, and the other output of which is first input to an attenuator 52, the output of which is provided to the VCR and associated meter. The attenuator is activated by the detector circuit 40 when the VCR is not in record mode. Both the VCR and the tv meters have the capability to select between the two cables.

Further shown in the FIG. 1 is an auxillary amplifier 30 for amplifying antenna or cable inputs having signals too weak to be reliably monitored by the tv meters. For example the second cable of the two cable input may first be input to AMP IN input 6, and the AMP OUT output 7 connected to the cable IN input 15.

I claim:

1. Apparatus for controlling the rf signal paths to and from a source of rf signals, a tv, a VCR and tv audience meters associated therewith for improved metering of the viewing of a tv and VCR combination, comprising:
    antenna input means for receiving input of rf signals;
    splitter means for splitting the rf signals into a tv signal path and a normally disabled VCR path;
    detector means for detecting the erase signal of the VCR; and
    means for enabling the VCR signal path in response to the means for detecting the erase signal.

2. The apparatus of claim 1 further including a VCR tv output signal path for conveying the VCR output to the tv set and bandpass filter means for passing only the VCR output channel.

3. The apparatus of claim 2 further including video enable means responsive to said detector means for enabling a meter associated with the VCR to determine the tuning of the VCR in response to the detection of an erase signal.

4. The apparatus of claim 3 wherein said video enable means comprises means for enabling a signal path between the video output of the VCR and its associated meter.

5. The apparatus of claim 1 wherein said means for detecting the erase signal includes a probe means mounted adjacent the VCR and connected to a means for level detecting the frequency of the erase signal; the probe means comprising a tuned antenna resonant at the frequency of the erase signal.

6. The apparatus of claim 1 wherein said probe means is attached to the VCR.

* * * * *